(12) United States Patent
Staab

(10) Patent No.: US 12,072,405 B2
(45) Date of Patent: Aug. 27, 2024

(54) CONTEXT-AWARE, INTELLIGENT BEACONING

(71) Applicant: RAYTHEON COMPANY, Waltham, MA (US)

(72) Inventor: Torsten A. Staab, Herndon, VA (US)

(73) Assignee: Nightwing Group, LLC, Dulles, VA (US)

( * ) Notice: Subject to any disclaimer, the term of this patent is extended or adjusted under 35 U.S.C. 154(b) by 269 days.

(21) Appl. No.: 17/521,724

(22) Filed: Nov. 8, 2021

(65) Prior Publication Data

US 2023/0146698 A1    May 11, 2023

(51) Int. Cl.
*G01S 1/02* (2010.01)
*G01S 1/04* (2006.01)
*H04W 4/029* (2018.01)

(52) U.S. Cl.
CPC ............ *G01S 1/024* (2013.01); *G01S 1/0428* (2019.08); *H04W 4/029* (2018.02)

(58) Field of Classification Search
CPC ....... G01S 1/024; G01S 1/0428; H04W 4/029
See application file for complete search history.

(56) References Cited

U.S. PATENT DOCUMENTS

| | | | |
|---|---|---|---|
| 7,515,715 B2 * | 4/2009 | Olive | H04L 9/0866 380/255 |
| 8,611,323 B2 | 12/2013 | Berger et al. | |
| 8,896,442 B1 | 11/2014 | Khan et al. | |
| 9,026,927 B2 | 5/2015 | Brumback et al. | |
| 9,269,251 B2 | 2/2016 | LaLonde et al. | |
| 11,809,555 B2 * | 11/2023 | Meyers | G06F 21/554 |
| 2003/0191818 A1 * | 10/2003 | Rankin | H04L 67/04 709/219 |
| 2005/0001720 A1 * | 1/2005 | Mason | G01S 19/17 340/539.2 |
| 2006/0008087 A1 * | 1/2006 | Olive | H04L 9/0618 380/255 |

(Continued)

FOREIGN PATENT DOCUMENTS

EP    3 118 830 A1    1/2017

OTHER PUBLICATIONS

Marko Korkalainen, Aki P. Mäyrä, and Klaus Känsälä "An open communication and sensor platform for urban search and rescue operations", Proc. SPIE 8540, Unmanned/Unattended Sensors and Sensor Networks IX, 854000 (Oct. 19, 2012). (Year: 2012).*

(Continued)

*Primary Examiner* — Yuwen Pan
*Assistant Examiner* — Swati Jain
(74) *Attorney, Agent, or Firm* — Cowan, Liebowitz & Latman, P.C.

(57) ABSTRACT

A device and method for context-aware, intelligent beaconing in a mission include: determining a current location of a beacon device; obtaining context information from one or more of a plurality of sensors, a database, a server, the beacon device, and external devices, wherein the context information includes behavior of the beacon device, and mission objectives; dynamically fusing the context information together to produce fused context information; dynamically setting a frequency for transmission of a beacon, based on the fused context information; and transmitting the beacon at the set frequency.

27 Claims, 6 Drawing Sheets

(56) References Cited

U.S. PATENT DOCUMENTS

| | | | |
|---|---|---|---|
| 2013/0166198 A1* | 6/2013 | Funk | G01C 21/1654 |
| | | | 701/446 |
| 2014/0100835 A1* | 4/2014 | Majumdar | G06Q 30/0261 |
| | | | 703/11 |
| 2014/0278044 A1 | 9/2014 | Jacobs et al. | |
| 2014/0375452 A1* | 12/2014 | Yuen | A61B 5/1123 |
| | | | 340/539.13 |
| 2015/0036517 A1* | 2/2015 | Ruutu | G01S 5/019 |
| | | | 370/252 |
| 2015/0293234 A1* | 10/2015 | Snyder | G01S 19/21 |
| | | | 342/357.59 |
| 2016/0217281 A1 | 7/2016 | Gupta et al. | |
| 2017/0023659 A1* | 1/2017 | Bruemmer | G01S 5/0278 |
| 2018/0082593 A1 | 3/2018 | Judd et al. | |
| 2018/0278462 A1* | 9/2018 | Bjontegard | H04L 41/044 |
| 2018/0338237 A1* | 11/2018 | Maheswaranathan | |
| | | | H04W 64/006 |
| 2019/0265694 A1* | 8/2019 | Chen | G08G 5/0069 |
| 2020/0107155 A1 | 4/2020 | Williams | |
| 2020/0307614 A1* | 10/2020 | Jordan | H04W 4/40 |
| 2020/0366702 A1 | 11/2020 | Mahaffey et al. | |
| 2020/0388168 A1* | 12/2020 | Ziemba | G05D 1/0011 |
| 2021/0049722 A1* | 2/2021 | Farris | G05D 1/0676 |
| 2021/0204195 A1* | 7/2021 | Crouthamel | G06K 7/10297 |
| 2022/0201433 A1* | 6/2022 | Yang | H04Q 9/00 |
| 2022/0232349 A1* | 7/2022 | Baek | H04W 4/80 |
| 2023/0013632 A1* | 1/2023 | Davis | A61B 5/165 |
| 2023/0156570 A1* | 5/2023 | Breaux, III | H04W 4/80 |
| | | | 381/86 |

OTHER PUBLICATIONS

International Search Report and Written Opinion dated Feb. 9, 2023 for corresponding PCT Application No. PCT/US2020/048455 (13 pages).

Bartoletti, et al., "5G Localization and Context-Awareness," 2018, pp. 167-187. https://www.5gitaly.eu/2018/wp-content/uploads/2019/01/5G-Italy-White-eBook-5G-Localization.

Cholda, et al., "Towards risk-aware communications networking," Aug. 28, 2021, Reliability Engineering and System Safety 109 (2013), pp. 160-174. https://art.torvergata.it/retrieve/handle/2108/81828/161203/CMN-RESS-2013.pdf.

Sepulcre, et al., "Congestion and Awareness Control in Cooperative Vehicular Systems," Jun. 2, 2011, IEEE, vol. 99, No. 7, pp. 1-21. https://ieeexplore.ieee.org/abstract/document/5783281.

\* cited by examiner

CONTEXT-AWARE, INTELLIGENT BEACONING

FIELD

The present disclosure relates generally to beacon signals, such as location tracking beacons, and more specifically to context-aware, intelligent beaconing.

BACKGROUND

Conventional location tracking devices typically transmit location updates at a set update frequency (e.g., once a minute) or in response to a hardware, using beacon signals. There are also some tracking devices that transmit locations only in response to user inputs (like location check-ins), proximity to specific geo-locations (e.g., geo-fencing), or in response to a hardware-based trigger (e.g., an accelerometer), while disregarding other important factors and constraints. Sending location updates too often, not often enough, or too late can impact location tracking accuracy, resource utilization (e.g., network bandwidth, power), and cost. Sending a location update at the wrong time (e.g., during an electronic warfare situation or reconnaissance mission) not only can endanger the life of the sender or recipients, but also compromises an entire mission.

To prevent these issues, a smarter, context-aware approach to location beaconing is needed.

SUMMARY

In some embodiments, the present disclosure is directed to a method executed by a plurality of processors for context-aware, intelligent beaconing in a mission. The method includes: determining a current location of a beacon device; obtaining context information from one or more of a plurality of sensors, a database, a server, the beacon device, and external devices, wherein the context information includes behavior of the beacon device, and mission objectives; dynamically fusing the context information together to produce fused context information; dynamically setting a frequency for transmission of a beacon, based on the fused context information; and transmitting the beacon at the set frequency.

In some embodiments, the present disclosure is directed to a method executed by a plurality of processors for context-aware, intelligent beaconing in a mission. The method includes: determining a current location of a beacon device; obtaining context information from one or more of a plurality of sensors, a database, a server, the beacon device, and external devices, wherein the context information includes behavior of the beacon device and mission objectives; dynamically fusing the context information together to produce fused context information; dynamically delegating transmission of a beacon to a second beacon device different than the beacon device, based on the fused context information; and transmitting the beacon at a frequency.

In some embodiments, the present disclosure is directed to a beacon device for context-aware, intelligent beaconing in a mission. The device includes: a location sensor for determining a current location of a beacon device; an interface circuit for: obtaining context information from one or more of a plurality of sensors, a database, a server, the beacon device, and external devices, wherein the context information includes behavior of the beacon device, and mission objectives, and obtaining fused context information produced by dynamically fusing the context information together. The device further includes a processor for dynamically setting a frequency for transmission of a beacon, based on the fused context information; and a transmitter for transmitting the beacon at the set frequency.

In some embodiments, the present disclosure is directed to a non-transitory storage medium having stored therein computer readable instructions. The instructions when executed by one or more processors perform a method for context-aware, intelligent beaconing in a mission. The method includes: determining a current location of a beacon device; obtaining context information from one or more of a plurality of sensors, a database, a server, the beacon device, and external devices, wherein the context information includes behavior of the beacon device, and mission objectives; dynamically fusing the context information together to produce fused context information; dynamically setting a frequency for transmission of a beacon, based on the fused context information; and transmitting the beacon at the set frequency.

In some embodiments, the present disclosure is directed to a method executed by a plurality of processors for context-aware, intelligent beaconing in a mission. The method includes: determining a current location of a beacon device; obtaining context information from one or more of a plurality of sensors, a database, a server, the beacon device, and external devices, wherein the context information includes behavior of the beacon device, and mission objectives; dynamically fusing the context information together to produce fused context information; dynamically delegating transmission of a beacon to a second beacon device different than the beacon device, based on the fused context information; and transmitting the beacon at the set frequency.

The beacon may be a location beacon, a wellbeing beacon, a cargo beacon, or the like. The context information may further include user biometrics, environmental conditions, location type and beacon device state.

BRIEF DESCRIPTION OF THE DRAWINGS

These and other features, aspects, and advantages of the present disclosure will become better understood with regard to the following description, appended claims, and accompanying drawings.

DETAILED DESCRIPTION

Figure 1:
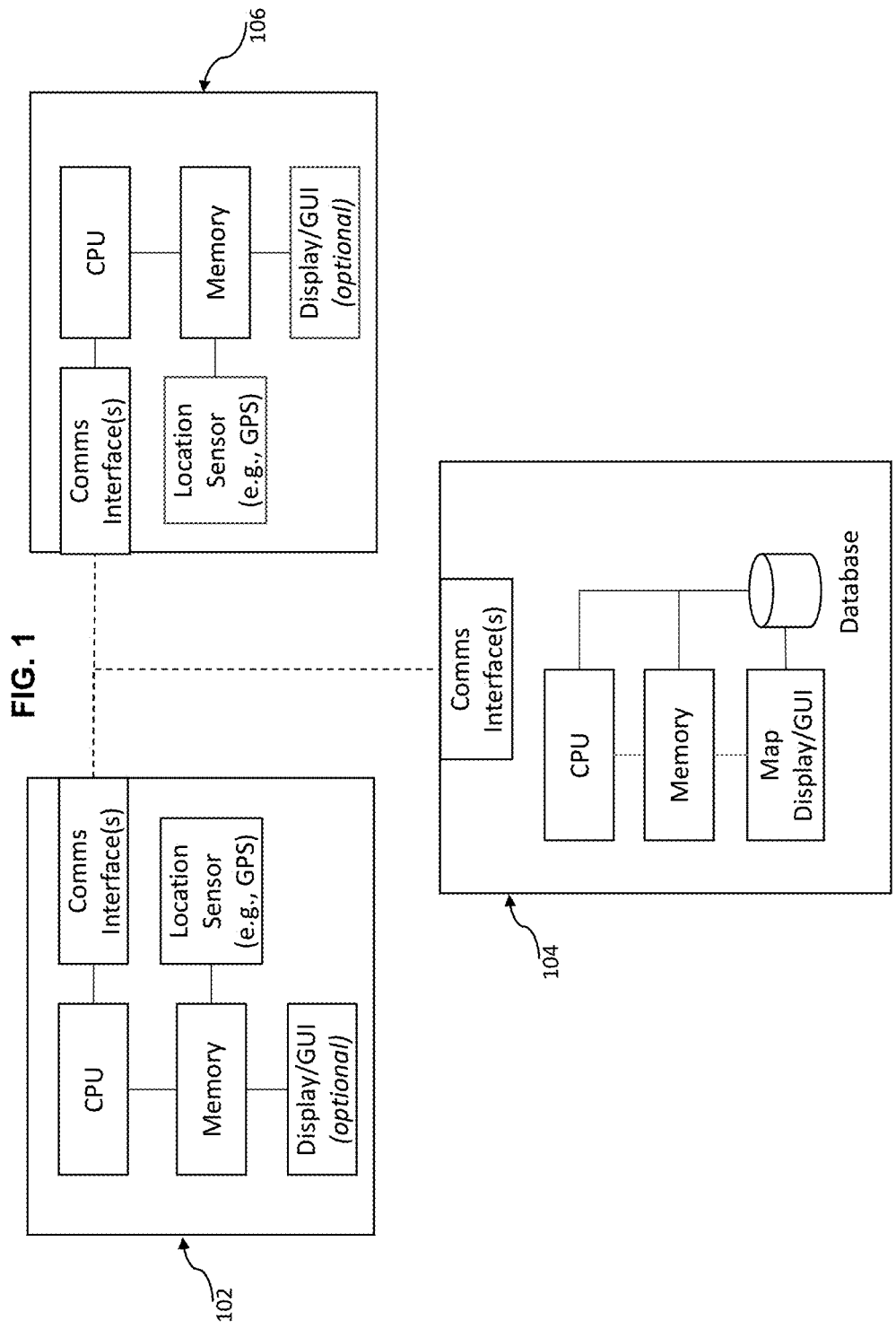
FIG. 1 shows a simplified block diagram of a tracking system, according to some embodiments of the present disclosure.

The figures and descriptions of the present disclosure have been simplified to illustrate elements that are relevant for a clear understanding of the present disclosure, while eliminating, for purposes of clarity, many other elements found in typical mapping, tracking and communications systems and devices. Those of ordinary skill in the art will recognize that other elements may be desirable and/or required in order to implement the present disclosure. However, because such elements are well known in the art, and because they do not facilitate a better understanding of the present disclosure, a discussion of such elements is not provided herein.

In some embodiments, the present disclosure includes an integrated hardware and software system that provides integrated communications and tracking in a device, for example a mobile device, communicatively coupled to one or more remote servers and other devices. The present disclosure extends transmission of beacon signals, location reporting and tracking capabilities beyond the limitations of individual beaconing and tracking devices and users through multi-level contextual sensing and beaconing. The disclosure provides dynamic, risk-graded, mission and context-aware beaconing and location reporting through multi-level, intelligent onboard and external contextual sensing, resource discovery, self-organization, resource sharing, grouping, collaboration, routing and/or risk-adaptive beaconing. The disclosure further achieves multi-domain contextual awareness through opportunistic environmental sensing, detection, and/or modeling of the user's/operator's physiological state, the user and device's behavioral states, and environmental conditions.

In some embodiments, the present disclosure leverages contextual data such as subject's physiological state, behavior, environmental and transmitter conditions, geo-location, and mission objectives to determine, when, what, where, and how often to report location. This also results in range and power extension of the system. In some embodiments, models for subject's physiological state and behavioral state are used to dynamically influence the parameters for beacon signals.

The device and system of the present disclosure differs from prior art by incorporating multi-source (e.g., device/user/environment/mission), contextual reasoning and/or mission objectives in its location reporting decision process. As mentioned above, in conventional approaches, the timing and frequency of when a locator beacon transmits a location update is either hardwired, user/admin software-configurable, or hardware event-driven (e.g., change in GPS coordinate, or an event from an on-board accelerometer). The present disclosure expands beaconing, location reporting and tracking capabilities beyond the limitations of individual beaconing or tracking devices and their users, through multi-level contextual sensing and awareness, dynamic resource discovery, collaboration, self-organization, intelligent routing, and/or dynamic beaconing, by multi-source, multi-sensor data fusion, state machine-based behavioral modeling, predictive geo-analytics, and/or risk analysis. In some embodiments, the present disclosure includes self-organizing beaconing (e.g., negotiating available resources), opportunistic beaconing (e.g., using best or optimized available resources), beacon stacking (consolidation of two or more beacons), and risk-based beaconing.

FIG. 1 shows a simplified block diagram of a tracking system, according to some embodiments of the present disclosure. As shown a (beacon) device 102, for example, a mobile device, includes a location module (e.g., GPS and/or other known location sensors), one or more communication modules/interface circuits, various memories, one or more CPUs, and optionally a display including a graphical user interface (GUI), each of which are operatively integrated, such as via an operating system. Each of the modules may be operatively integrated with a data encrypting transceiver that wirelessly couples the device 102 with one or more remote beaconing servers 104 (e.g., beacon tracking servers) and one or more other similar (beaconing) devices 106. Each of such remote servers is operatively connected to one or more GUIs capable of inter-operating with a like-GUI at the display of the devices 102 and 106.

The various communications modules/interface circuits are communicatively connected, via the CPU, to associated communications hardware, such as one or more antennae, modems, and amplifiers (not shown for simplicity purposed) for facilitating different communication modes. For example, in order to perform transmission functions, the device may include a plurality of communication modems/interface circuits controlled by the communication module, such as an Iridium, Short Burst Data Satellite, Bluetooth, RF, line-of-site (LOS), optical, and the like.

The communications module makes available device-to-device (e.g., device 102 to device 106) communications, and/or device-to-beaconing server (device 102 to server 104) communications. In the event of failure of one mode of communication in a communication attempt, alternative modes of communication are made readily available to the devices 102 and 106, and the prioritization of use of such various modes of communications may be managed by the communication module in conjunction with the CPU of the devices 102 and 106, and context information, as described below. For example, device 102 may exercise device-to-device and device-to-central messaging using alternative communications systems/modes. Furthermore, the communication module may include emergency modes. For example, device 102 may be set to transmit an emergency locating beacon.

In some embodiments, device 102 may be any multi-purpose mobile device, such as a smart-phone, a tablet computer, a laptop computer, a smart watch, a portable digital assistant, and the like, or may be a specialized device (mobile or fixed) designed for the specific purpose of facilitating beaconing and/or tracking of assets. Device 102 has, at a minimum, a positioning system receiver, a transmitter operable to communicate data to the server 104 and/or device 106 over the network and different routines for performing various operations associated with determining the position of the device and/or assets, power management, one or more memories for storing data and one or more communication circuits for communication of data to the server 104 and other devices/networks. In some embodiments, device 102 may be positioned or fixed in a vehicle, structure, antenna, building, and the like.

Device 102 may be configured to receive an indication of a status and behavior of an asset, its environment, other assets (friendly and/or hostile), communication networks available to the device at the time, mission objectives, and the like. The communication module may be configured to send a signal to a computing device remote from the asset using a communication mode selected from a plurality of communication modes, based on context information. A tracking module of the device 102 and/or of the beaconing server(s) 104 may track asset(s) associated with the device and send a beacon signal to be received by the beaconing server(s) 104 or other devices. The device automatically selects the communication mode and/or the characteristics of the beacon signal from the plurality of communication modes, based at least in part on the indication of the device, environment, and/or behavior of the asset.

The tracking module may track the wellbeing of assets by bodily function monitoring of persons, by environmental circumstance sensing and by monitoring of other sensors, such as biometric sensors, environment and weather sensors, movement sensors, damage sensors, pressure sensors, acceleration sensors, weight sensors, and the like. For example, in military applications, the devices of the present device may allow for the tracking of friendly forces and/or hostile forces. The wellbeing of friendly forces may be tracked by the tracking module, as may be the assets associated with those persons, and the device mapping module may similarly make available to other users the position of such persons and assets.

In some embodiments, device 102 further includes radio frequency (RF) transceivers (or transmitters) to act as a relay device for data transmission between the external devices. In some embodiments, the external devices can be configured using, for example, a satellite link, by pairing with a smartphone or tablet, or by using other wireless connections. Once configured, the device can send data or a request for data to the external devices. The device can also receive or send data, such as beacon messages, from/to external devices without having to request for it.

In some embodiments, the device further includes a digital compass, an accelerometer, a signal strength and power indicator, respective outputs of which may be displayed on an optional display and transmitted to other devices, including the beaconing server 104. The device is capable of communicating with other devices (e.g., device 106) through various links and may include independent sensors/beacons with compatible embedded RF, cellular and other transceivers. This way, the device transmits, receives, and relays track, status, emergency call (e.g., 911), message and other data to a variety of different devices.

Figure 2:
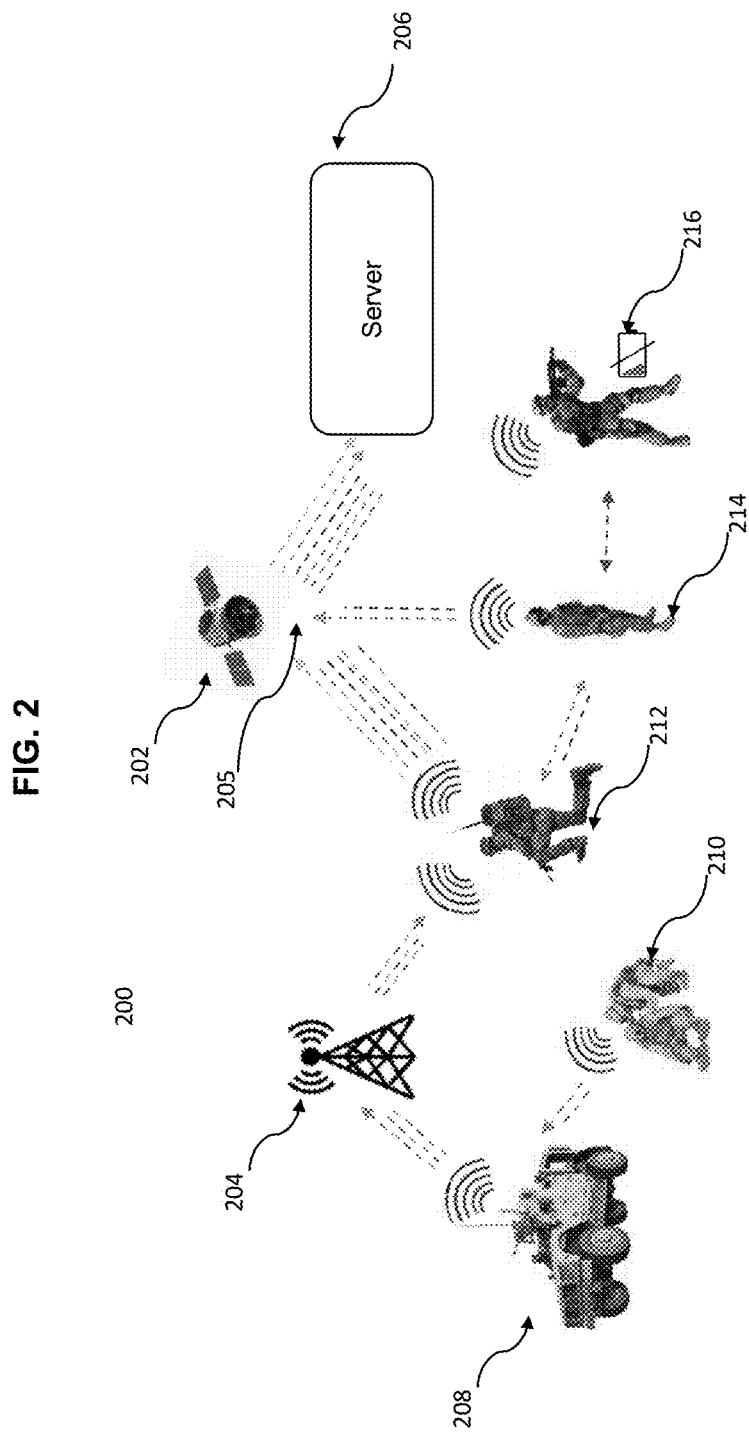
FIG. 2 illustrates a block diagram of an exemplary environment for a tracking system, according to some embodiments of the present disclosure.

FIG. 2 illustrates a block diagram of an exemplary environment 200 for a tracking system, according to some embodiments of the present disclosure. As illustrated, the environment 200 includes a server 206 communicating with a satellite 202 via a network 205, and devices associated with a group of mobile assets each having at least one device 208, 210, 212, 214 and 216. The mobile assets 208, 210, 212, 214 and 216 may be any mobile assets that the system wishes to track, including, for example, vehicle 208 (e.g., Humvees, automobiles, trucks, aircraft, etc.), entities 210, 212, 214 and 216 (e.g., people), cargo (not shown), fixed beaconing/communication towers 204, and the like. In the case of a vehicle or a moving platform 208, the device may be fixed to the vehicle or be a portable mobile device positioned in the vehicle. Each asset has a device, similar to device 102 in FIG. 1, associated with it. Each device is operable to determine its location and the associated asset. In some embodiments, the movement of a mobile device (mobile asset) is tracked and along with its location reported to the server 206, for example, using the satellite 202, Internet, and/or other communication channels. Server 206 includes a tracking and locating (TL) module for tracking and locating the assets, using for example, the location beacons transmitted by the devices.

Each mobile device (of the mobile assets 208, 210, 212, 214 and 216) determines its location using a location determining system receiver and/or a satellite positioning system receiver, such as, Global Positioning System (GPS). The location determining system receiver can be any type of positioning system receiver, operating off of terrestrial navigation signals, satellite navigation signals, cellular signals, etc. Where satellite navigation signals are employed for positioning, the receiver can receive signals from the GPS, or other positioning systems. The environment 200 may also include fixed assets, such as a wireless communication channel/tower 204, which may also include a device similar to device 102 of FIG. 1.

Also, each device is capable of communicating with the server 206 using the network 205, which may be the Internet. However, each device may use the wireless communication channel 204 to send data from the device to the network 205 and/or directly to other devices (i.e., peer-to-peer and client/server communications). Each device may also communicate over a data uplink to satellite 202 which, in turn, may transmit data using a data downlink to the communication channel 204. The communication channel 204 may transmit the data to the server 206 directly or via the network 205 or other available networks.

The devices of the assets may also communicate with each other and communicate through each other to other devices or systems. For example, when a mobile device with an associated asset 216 is running low on power (i.e., battery) in order to communicate with the satellite 202, remote server 206 or communication channel 204, it establishes its communication to satellite 202, remote server 206 or communication channel 204, via one or more neighboring asset with associated mobile device 214. Mobile device 214 can then communicate with satellite 202, remote server 206 or communication channel 204, via the network 205. It is noted that communications between the devices/systems of FIG. 2 include adaptive transmission of a beacon (such as a location or wellness beacon, plus optional meta data such as sensor measurements or location data from other beacons) at certain times and certain frequencies. A remote user/operator can log on to server 206 including the TL system, for example a command, control and communication (C3) system, or a command and control (C2) system, via the Internet or satellite to send/receive messages to/from devices and to display their location on (a map on) a display screen.

Each of the assets, the devices, or the environment itself may include various sensors to detect events or changes in the environment or the assets. Each of the assets or their respective devices may include a biometric sensor to sense well-being of the entities 210, 212, 214 and 216, for example, their heart rate, temperature, gait, mobility, etc. Other sensor may detect the entities' behavior, such as posture (standing, lying, crawling, etc.), movement (walking, running, driving, breaking, etc.), and the like. Environmental sensors detect the environment conditions, such as, temperature, humidity, visibility, signal strength or range, and the like. Some of the above-mentioned information may also be derived from various databases (remote and/or local on the devices) and then fused together with the sensors' data, as described below with respect to FIG. 3.

Location sensors, in addition to the positioning sensors described above may be present to detect whether the devices/assets are indoor, outdoor, or underground, inside or outside a geofence, or pattern of life deviation of the assets. The devices may also include sensors to measure acceleration, altitude and latitude, and the like. Device's various states of operation, such as, power status, various sensor status, communication modes, operation status, signal reception status, and status of other components are detected and made available to the device.

Figure 3:
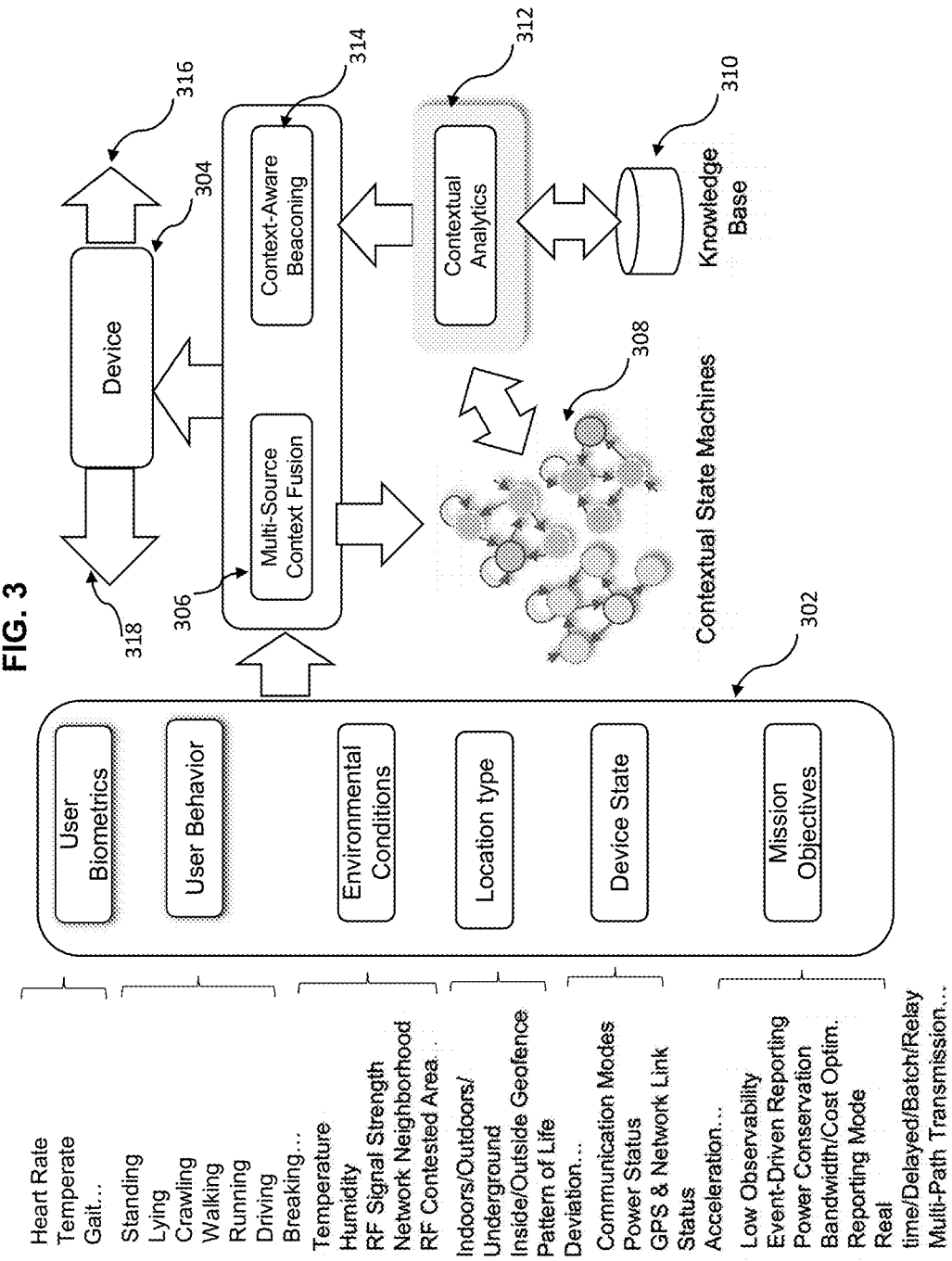
FIG. 3 depicts a simplified architectural block diagram of a tracking system with context-aware, intelligent beaconing, according to some embodiments of the present disclosure.

FIG. 3 depicts a simplified architectural block diagram of a tracking system with context-aware, intelligent beaconing, according to some embodiments of the present disclosure. As shown, context information 302 is used by a multi-source context fusion module 306 to produce various contextual state machines 308 for a beaconing device 304. The state machines 308 determine which state device 304 is in and what states it could transit to, based on a combination of various context information 302 produced by the multi-source context fusion module 306.

In some embodiments, depending on the implementation of the state machine(s), the device might be in multiple states, for example, it may have a state machine to track motion status (i.e., moving, standing, . . . ), it may have a separate state machine to track environmental conditions (e.g., internal/external temperate, humidity, etc.), a state machine for tracking power status (i.e., 100%, 50%, 0% power), and the like. Business logic/rules may then be used to describe when and how the device will change state or react based on the various states it is in. For instance, if battery level is low and motion state is "standing," then beaconing frequency is changed from 1 every one minute to every ten minutes.

A contextual analytics engine 312 takes the state machines of the device 304 and data from a knowledge base database 310 to dynamically produce the parameters for the context-aware beaconing by the device 304. Data contained in the knowledge base may include business rules that prescribe the expected behavior of device 304 under certain conditions; device performance-derived heuristics to help optimize device operations; mission-specific knowledge (e.g., geo fences, off limits areas, no fly zones, silent zones) or other, beacon decision-relevant data (e.g., satellite image or social media-derived event data) that device 304 has no direct access to.

A beaconing circuit/module of the device 304 then generates a context-aware beacon 316. The current state of the device and the parameters for the context-aware beacon 316 may then get transmitted back (i.e., as a feedback loop) to the context information 302 and other (external) devices. Context information 302 may then be revised based on the feedback information 318. Also, the external devices' behaviors and communication modes and routes with the device 304 may be revised based on the feedback information 318. The context-aware beacon 316 may be a location beacon for people, wellbeing beacon, cargo, vehicles, vessels, airplanes, warning beacons, and beacons for other space-, air-, ground-, or sea-based systems. As recognized by one skilled in the art, the context information 302, knowledge base database 310, contextual state machines 308 contextual analytics 312 and multi-source fusion may reside or executed fully or partially on the device 102, beaconing server 104, other neighboring devices, and/or other external devices.

In some embodiments, context information 302 includes, user biometrics, user behavior, environmental conditions, location type, device state, mission objectives, and the like. User biometrics may include, for example, heart rate, temperature, oxygen level, gait and the like. User behavior information may include, for example, standing, lying, crawling, walking, running, driving, biking, breaking, swimming, and the like. Environmental conditions may include, for example, temperature, humidity, barometric pressure, altitude, terrain, signal strength due to the environment, neighboring networks, signal restricted or contested areas, surroundings, weather, and the like. Location type information may include, for example, indoor or outdoor, underground, inside or outside a building or a geofence, pattern of life (location) deviations, and the like.

Device state information may include, for example, communication modes, such as Bluetooth, RF, short-range, cellular, optical LOS, power status, and the like. Mission objectives may include, for example, low observability, event-driven reporting, power conservation, bandwidth/cost optimization, reporting mode (one-to-one, one-to-many, many-to-one, etc.), real-time, delayed, batch and/or relay transmission, multi-path transmission, specific path transmission, and the like. In some embodiments, the device utilizes the contextual state machines 308, which may be a combination of context information 302 and the events causing the state changes, to dynamically change the frequency (i.e., the time intervals of the transmission), communication mode, reporting mode, signal type, signal strength and/or signal routing.

In some embodiments, the device of the present disclosure uses portions of the user biometrics, user behavior (e.g., actions), environmental conditions, location, device state and/or mission objectives and fuses them together to produce a context-sensitive, dynamically adjustable beacon signal, for example, a location beacon signal. For instance, if the heart rate and/or temperature of a person associated with the device if out of normal range (too high or too low) within a threshold, the device may increase the frequency of the location beacon signal, so that such person may be found and attended to more quickly. Similarly, if the person is lying or crawling, the frequency of the beacon signal may be increased for similar reasons. On the other hand, depending on the location information of the person and/or mission objective, the frequency of the beacon signal may be reduced, while the person is lying or crawling, because a higher frequency may lead to higher chance of discovering the person's location by hostile forces.

Similarly, when the temperature and/or humidity of the environment is high, the frequency of the beacon signal may be increased to help locate the person's location quicker and more accurately. Likewise, if the person is inside or underground (i.e., location type), the frequency (and potentially the strength) of the beacon signal may be increased to help locate the person's location quicker and more accurately. Furthermore, if the person's actions, location and/or behavior is deviating from an expected routine (e.g., from a user or mission profile stored in the knowledge base database 310), the frequency of the beacon signal may be increased to help locate the person's location quicker and more accurately. If the device is transmitting the beacon using a LOS (Line of Sight) transmission mode and such transmission mode is not working properly and/or the visibility of environment is low, the device may change its beacon transmission mode to, for example, an RF transmission mode.

In some embodiments, the device uses opportunistic beaconing by discovering/detecting and leveraging public and private communications options and peer devices or network nodes, and adjusting beacon frequency dynamically and/or delegating the beacon to other device(s) using a different transmission route than the transmission route of the previous beacon transmitted by the device, also based on changing conditions and mission objectives. Likewise, when the device power (battery) is low and GPS or network is unavailable, the device may change the frequency, routing and/or transmission mode of its beacon, depending on mission objectives. When the beacon is being transmitted via a plurality of network nodes and one or more of the nodes are disabled, the device changes it transmission routing by changing the node and/or the network.

The signal strength of the beacon signal and/or reports contained in the beacon may also be dynamically revised. In some cases, the device may delay or batch the transmission of the beacon as well, depending on the mission objectives and/or environmental conditions. For instance, if the environment and/or mission objectives indicate a hostile or harsh condition, the beaconing may be delayed or batched. In some embodiments, the device discovers (detects) other (e.g., peer) beacon signals and piggy-back its signal on the discovered signal depending on other contextual information, such as device state and power, environmental conditions and/or mission objectives. The reporting of the location may also be adjusted, e.g., appended to the other report by the other discovered beacon signal.

The device is also capable of performing look-ahead location beaconing. For example, if the person's movement patterns are known (e.g., from a user profile), the device may include a predicted location at a certain future time included in the beacon signal. Also, if the predicted location is a restricted area or inside a tunnel, the device adjusts its beaconing (e.g., frequency, signal strength, communication mode, and the like), before and/or after the device reaches or leaves the restrictive area. Also, if a mobile device (and respective asset) is accelerating, the frequency of the beacon will increase to provide a more accurate location. On the other hand, if the mobile device is decelerating, the frequency of the beacon will decrease to save power and possibly reduce the risk of location discovery. The device is also capable of offset beaconing. For instance, if there are two options for a transmission route and they deviate by more than a threshold, the device may stop or delay the beaconing.

In some embodiments, the device considers the risk of beacon transmission at a certain frequency and conditions and changes the parameters of the beacon signal, for instance, frequency, delay or interruption, reports, routing, signal strength and the like. For a risk-based beaconing, the device dynamically adjusts reporting frequency or goes dark in high-risk areas, performs offset-based or batch beaconing. Risks may include warfare or hostile environment, running out of power, injury or incapacitation of the asset, or the like, each of which may be dynamically graded (for example based on the mission objectives), based on its importance at the time.

The risks may be provided in the mission objectives, knowledge base 310, detected by the device, or dynamically transmitted to the device. For example, if the environment includes nearby hostile forces, the device is low in power or the weather is bad, transmission of the beacon may be delayed, a different transmission mode selected, and/or the signal routing, type or strength may change. As the risk dynamically may change, the parameters of the beacon transmission are also dynamically changed.

In some embodiments, the device includes deception mode and offset beaconing. For example, if the beacon itself or via an external sensor (or a connected server) detects or is instructed that it is being (GPS-) spoofed or monitored (e.g., in an electronic warfare scenario), the device can change its beaconing behavior (e.g., frequency, delegations and/or location) and enter a deception mode. Deception mode includes the beacon not reporting its real location. Instead it would report a fake, randomly selected, or offset location.

Figure 4:
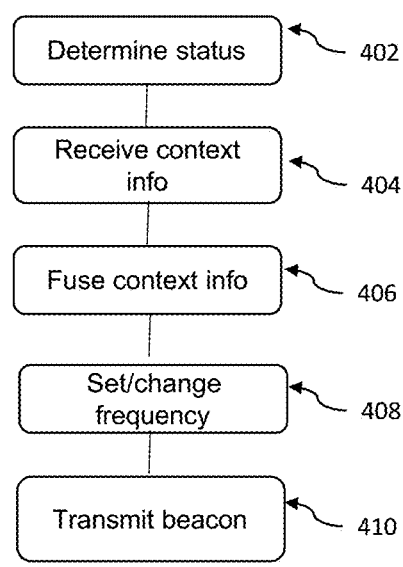
FIG. 4 is a simplified process flow for context-aware, intelligent beaconing, according to some embodiments of the present disclosure.

FIG. 4 is a simplified process flow for context-aware, intelligent beaconing, according to some embodiments of the present disclosure. As shown in block 402, a beacon device determines its status, for example, its location. In block 404, context information, such as user biometrics, user behavior, environmental conditions, location, device state, mission objectives, and the like is dynamically obtained, for example, for a plurality of sensors, databases, one or more servers, the device itself and/or other devices. In block 406, the context information is dynamically fused together, for instances, by the multi-source context fusion 306 in FIG. 3, residing on the beaconing server, the device, other devices and/or a combination thereof, as described above. In block 408, the device dynamically sets the frequency for transmission of a beacon, for example, a location beacon, based on the fused context information. The beacon signal is then transmitted, in block 410. If the device is already transmitting a beacon, the frequency of the beacon is dynamically changed, based on the fused context information.

Figure 5:
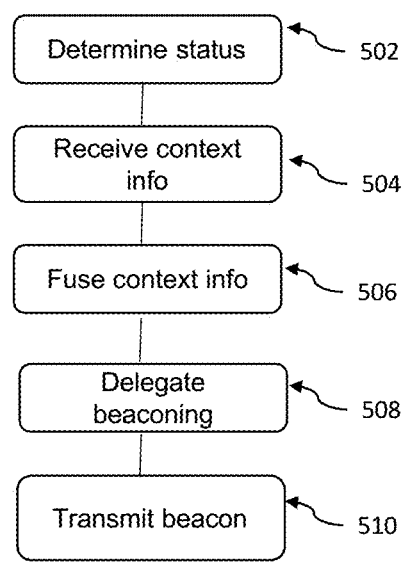
FIG. 5 is a simplified process flow for context-aware, intelligent beaconing, according to some embodiments of the present disclosure.

FIG. 5 is a simplified process flow for context-aware, intelligent beaconing, according to some embodiments of the present disclosure. As shown in block 502, a beacon device determines its status, for example, its location. In block 504, context information, such as user biometrics, user behavior, environmental conditions, location, device state, mission objectives, and the like is dynamically obtained, for example, for a plurality of sensors, databases, one or more servers, the device itself and/or other devices. In block 506, the context information is dynamically fused together, for instances, by the multi-source context fusion 306 in FIG. 3, residing on the beaconing server, the device, other devices and/or a combination thereof, as described above. In block 508, the device dynamically performs collaborative beaconing by delegating the beaconing to other device or devices. If the device is already transmitting a beacon using a particular transmission route, other device or devices may use a different transmission route, based on its own contextual information or device state. The beacon signal is then transmitted by the other device or devices, in block 510.

This way, a dynamic, context-aware, mission objective-driven, collaborative beaconing results in range and power extension of the device/system. As known in the art the processes of FIGS. 4 and 5 may be performed by software and/or firmware executed by one or more processor.

Figure 6:
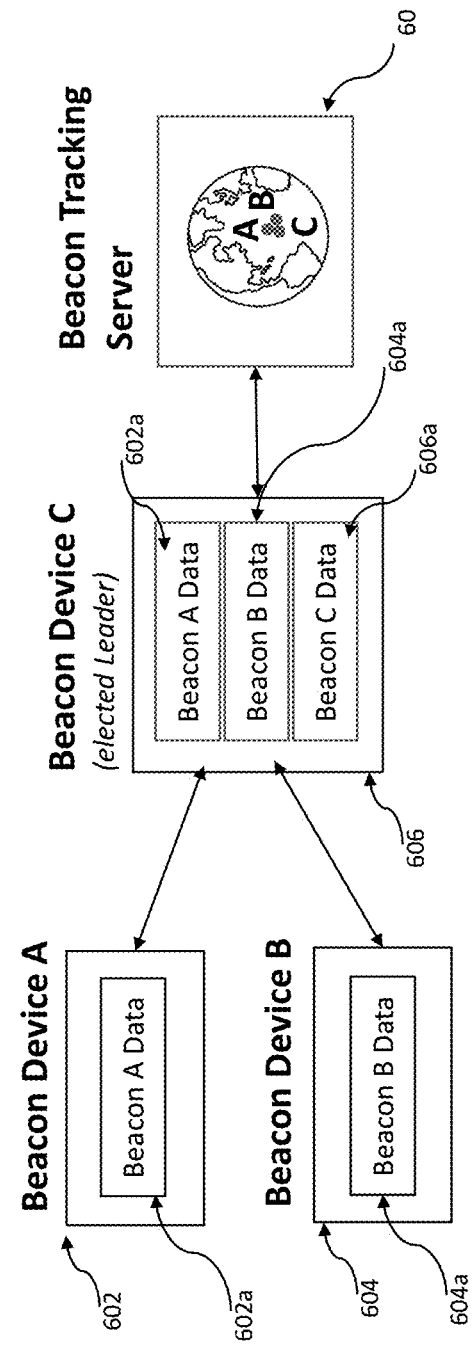
FIG. 6 is a simplified block diagram of beacon organizing, according to some embodiments of the present disclosure.

FIG. 6 is a simplified block diagram of beacon organizing, according to some embodiments of the present disclosure. In some embodiments, a beacon device 602 performs self-organizing beaconing. For instances, device 602 determines which other devices (e.g., beacon devices 604 and 606) are part of its team/device cluster and learns about the environment and available resources. For example, when there are three beacons available, two of which might be equipped with short range RF modems while one might have a short-range RF and a satellite modem, self-organizing beaconing would allow the beacon devices 602 and 606 to discover each other, share a limited resource such as the one beacon's satellite modem (e.g. in beacon device 606), exchange their beacon data 602a and 604a (e.g., locations), synchronize their behaviors, and elect a "leader" (beacon device 606), if desired. The lead beacon device 606 may then perform beacon stacking, i.e., collect all the information (beacon data 602a and 604a) from other beacon devices (602 and 604) and package all in one message/beacon to be transmitted to a beacon tracking server 608. The collected information may also include beacon data 606a for the lead beacon device 606. This would allow other beacon devices to conserve resources such as network bandwidth and power. It also reduces the overall number of beacon messages to be transmitted to the beacon tracking server 608, thereby reducing the RF signature and probability of detection while operating in adversarial environments.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

The invention claimed is:

1. A method executed by a plurality of processors for context-aware, intelligent beaconing in a mission, the method comprising:
    determining a current location of a beacon device;
    obtaining context information from one or more of a plurality of sensors, a database, a server, the beacon device, and external devices, wherein the context information includes behavior of the beacon device, and mission objectives;
    dynamically fusing the context information together to produce fused context information;
    determining whether the beacon device is being one of spoofed and monitored;
    in response to determining that the beacon device is being one of spoofed and monitored, engaging a deception mode;
    dynamically setting a frequency for transmission of a beacon, based on the fused context information;
    transmitting the beacon at the set frequency, the beacon reporting a fake location rather than a real location of the beacon device while the beacon device is in the deception mode;
    delaying or batching the transmission of the beacon based on the fused context information indicating hostile or harsh conditions associated with the beacon device; and
    detecting at least one of communications options or network nodes, and adjusting the frequency and route of transmission of the beacon further based on the at least one of communications options or network nodes.

2. The method of claim 1, wherein the beacon is a location beacon, a wellbeing beacon, or a cargo beacon.

3. The method of claim 1, wherein the context information further includes user biometrics, environmental conditions, location type, and beacon device state.

4. The method of claim 1, further comprising determining which state the beacon device is in and what state the beacon device is to transition to, based on the fused context information.

5. The method of claim 1, further comprising delegating transmission of the beacon to one or more other devices, based on the fused context information.

6. The method of claim 1, further comprising monitoring power level of the beacon device and adjusting the frequency for transmission of the beacon further based on the power level.

7. The method of claim 1, further comprising combining the beacon with one or more other beacons, based on the fused context information.

8. A beacon device for context-aware, intelligent beaconing in a mission comprising:
    a location sensor configured to determine a current location of a beacon device;
    an interface circuit configured to:
    obtain context information from one or more of a plurality of sensors, a database, a server, the beacon device, and external devices, wherein the context information includes behavior of the beacon device, and mission objectives, and
    obtain fused context information produced by dynamically fusing the context information together;
    a processor configured to:
    dynamically set a frequency for transmission of a beacon, based on the fused context information,
    determine whether the beacon device is being one of spoofed and monitored; and
    in response to a determination that the beacon device is being one of spoofed and monitored, engage a deception mode; and
    a transmitter configured to transmit the beacon at the set frequency, the beacon reporting a fake location rather than a real location of the beacon device while the beacon device is in the deception mode,
    wherein the processor is further configured to:
    delay or batch transmission of the beacon based on the fused context information indicating hostile or harsh conditions associated with the beacon device; and
    detect at least one of communications options or network nodes, and adjust the frequency and route of transmission of the beacon further based on the at least one of communications options or network nodes.

9. The beacon device of claim 8, wherein the beacon is a location beacon wellbeing beacon, or a cargo beacon.

10. The beacon device of claim 8, wherein the fused context information is obtained from one or more of the server, the beacon device, and the external devices.

11. The beacon device of claim 8, wherein the context information further includes user biometrics, environmental conditions, location type, and beacon device state.

12. The beacon device of claim 8, wherein the beacon device is a mobile device.

13. The beacon device of claim 8, wherein the processor is configured to determine which state the beacon device is in and what state the beacon device is to transition to, based on the fused context information.

14. The beacon device of claim 8, wherein the processor is configured to delegate transmission of the beacon to one or more other devices, based on the fused context information.

15. The beacon device of claim 8, wherein the processor is configured to monitor power level of the beacon device and adjusts the frequency for transmission of the beacon further, based on the power level.

16. The beacon device of claim 8, wherein the processor is configured to control the transmitter to transmit the beacon to a second beacon device for combining the beacon with one or more other beacons, based on the fused context information.

17. A non-transitory storage medium having stored therein computer readable instructions, the instructions when executed by one or more processors perform a method for context-aware, intelligent beaconing in a mission, the method comprising:
    determining a current location of a beacon device;
    obtaining context information from one or more of a plurality of sensors, a database, a server, the beacon device, and external devices, wherein the context information includes behavior of the beacon device, and mission objectives;
    dynamically fusing the context information together to produce fused context information;
    determining whether the beacon device is being one of spoofed and monitored;
    in response to determining that the beacon device is being one of spoofed and monitored, engaging a deception mode;
    dynamically setting a frequency for transmission of a beacon, based on the fused context information;

transmitting the beacon at the set frequency, the beacon reporting a fake location rather than a real location of the beacon device while the beacon device is in the deception mode;

delaying or batching the transmission of the beacon based on the fused context information indicating hostile or harsh conditions associated with the beacon device; and detecting at least one of communications options or network nodes, and adjusting the frequency and route of transmission of the beacon further based on the at least one of communications options or network nodes.

18. The non-transitory storage medium of claim 17, wherein the beacon is a location beacon, a wellbeing beacon, or a cargo beacon.

19. The non-transitory storage medium of claim 17, wherein the context information further includes user biometrics, environmental conditions, location type, and beacon device state.

20. The non-transitory storage medium of claim 17, wherein the beacon device is a mobile device.

21. The non-transitory storage medium of claim 17, wherein the method further comprises determining which state the beacon device is in and what state the beacon device is to transition to, based on the fused context information.

22. The non-transitory storage medium of claim 17, wherein the method further comprises delegating transmission of the beacon to one or more other devices, based on the fused context information.

23. The non-transitory storage medium of claim 17, wherein the method further comprises monitoring power level of the beacon device and adjusting the frequency for transmission of the beacon further based on the power level.

24. The non-transitory storage medium of claim 17, wherein the method further comprises combining the beacon with one or more other beacons, based on the fused context information.

25. A method executed by a plurality of processors for context-aware, intelligent beaconing in a mission, the method comprising:

determining a current location of a beacon device;

obtaining context information from one or more of a plurality of sensors, a database, a server, the beacon device, and external devices, wherein the context information includes behavior of the beacon device and mission objectives;

dynamically fusing the context information together to produce fused context information;

determining whether the beacon device is being one of spoofed and monitored;

in response to determining that the beacon device is being one of spoofed and monitored, engaging a deception mode;

dynamically delegating transmission of a beacon to a second beacon device different than the beacon device, based on the fused context information;

transmitting the beacon at a frequency, the beacon reporting a fake location rather than a real location of the beacon device while the beacon device is in the deception mode;

delaying or batching the transmission of the beacon based on the fused context information indicating hostile or harsh conditions associated with the beacon device; and detecting at least one of communications options or network nodes, and adjusting the frequency and route of transmission of the beacon further based on the at least one of communications options or network nodes.

26. The method of claim 25, wherein the beacon is a location beacon wellbeing beacon, or a cargo beacon.

27. The method of claim 25, wherein the context information further includes user biometrics and environmental conditions.

* * * * *